(12) United States Patent  
Ishizuka et al.

(10) Patent No.: US 8,187,665 B2
(45) Date of Patent: May 29, 2012

(54) THIN FILM FORMING METHOD AND COLOR FILTER MANUFACTURING METHOD

(75) Inventors: Hirotaka Ishizuka, Yamanashi (JP); Satoru Katagami, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 702 days.

(21) Appl. No.: 12/332,833

(22) Filed: Dec. 11, 2008

(65) Prior Publication Data

US 2009/0191326 A1 Jul. 30, 2009

(30) Foreign Application Priority Data

Jan. 29, 2008 (JP) .................................. 2008-017874

(51) Int. Cl.
*C23C 14/54* (2006.01)

(52) U.S. Cl. ................. 427/58; 427/9; 427/68; 427/168

(58) Field of Classification Search ................. 427/9, 58, 427/68

See application file for complete search history.

(56) References Cited

U.S. PATENT DOCUMENTS

| 7,459,177 B2 * | 12/2008 | Kimura et al. ................. 427/162 |
| 7,483,147 B2 | 1/2009 | Kim et al. |
| 2006/0028510 A1 | 2/2006 | Park et al. |
| 2007/0052119 A1 * | 3/2007 | Sakai et al. ..................... 264/1.7 |
| 2007/0109606 A1 | 5/2007 | Nagae |

FOREIGN PATENT DOCUMENTS

| JP | 2003-159787 A | | 6/2003 |
| JP | 2006-003870 A | | 1/2006 |
| JP | 2006003870 | * | 1/2006 |
| JP | 2006-276116 A | | 10/2006 |
| JP | 2006276116 | * | 10/2006 |
| JP | 2007-136310 A | | 6/2007 |
| JP | 2007136310 | * | 6/2007 |
| KR | 2006-013060 A | | 2/2006 |
| KR | 2006-052004 A | | 5/2006 |

* cited by examiner

*Primary Examiner* — Timothy Meeks
*Assistant Examiner* — Nathan T Leong
(74) *Attorney, Agent, or Firm* — Global IP Counselors, LLP (57) ABSTRACT

A method for forming a thin film by discharging a liquid including a material for forming the thin film, the material being dissolved or dispersed in a solvent, from a plurality of nozzles so as to dispose the liquid into a plurality of predetermined areas included in an effective area set on a substrate to form the thin film while the plurality of nozzles and the substrate are relatively scanned, includes: (a) forming a plurality of reception parts surrounded by a plurality of partitions and bottoms of the predetermined areas, the partitions being provided around the predetermined areas; and (b) forming a plurality of thin films by disposing the liquid from the nozzles into the reception parts. In step (a), a plan view area of at least one of the reception parts in a peripheral area of the effective area is made smaller than a plan view area of the reception part in a central area of the effective area.

8 Claims, 7 Drawing Sheets

THIN FILM FORMING METHOD AND COLOR FILTER MANUFACTURING METHOD

BACKGROUND

1. Technical Field

The present invention relates to a thin film forming method using a droplet discharge method and a color filter manufacturing method using the thin film forming method.

2. Related Art

Attention has been paid to thin film forming techniques using a droplet discharge method in recent years. A key feature of the droplet discharge method is that the method allows applying a minute liquid to desired positions in accordance with the resolution of a droplet discharge head so that a minute pattern or thin films having a desired thickness is easily formed. The droplet discharge method having such a feature has been used in a color filter manufacturing process in which colors must be selectively applied in a minute manner, for example, by discharging a liquid, in which a material for forming colored layers (thin films) is dissolved or dispersed in a solvent.

One of the characteristics of a droplet discharge head with respect to the discharge of a liquid is unevenness, albeit slight, in amount of the discharged liquid (hereafter may be referred to as a "discharge amount") among nozzles due to such as an error caused when forming thin films. This unevenness in discharge amount causes differences in thickness among formed thin films (unevenness in film thickness). For this reason, various methods for preventing such unevenness by controlling the amounts of the liquid discharged from individual nozzles have been proposed. For example, JP-A-2003-159787 proposes a droplet discharge head that is allowed to restrict the discharge of a droplet from a nozzle whose droplet discharge amount is significantly different from a predetermined value so as to reduce differences in discharge amount as a whole.

Incidentally, unevenness in thickness of formed thin films is also caused by a factor other than unevenness in discharge amount among the discharge nozzles.

For example, if thin films are formed using the droplet discharge method, minute droplets of a liquid are discharged and applied to a substrate with a high resolution; however, the liquid discharged on the substrate on which thin films are to be formed is dried extremely rapidly. Also, partial pressure applied to solvent molecules to be evaporated from the liquid composition in a peripheral area of an application area on the substrate is lower than that in the central area thereof. In other words, the solvent vapor concentration in the peripheral area is lower than that in the central area. Accordingly, the solvent evaporates more rapidly in the peripheral area than in the central area. With the evaporation of the solvent, for example, a flow of the liquid from the inside thereof toward a surface thereof occurs inside the disposed liquid. In this case, the state of the flow in an area where the solvent evaporates actively is different from that in an area where the solvent does not evaporate actively. As a result, there occurs a difference in state of formed films between these areas.

Figure 10A:
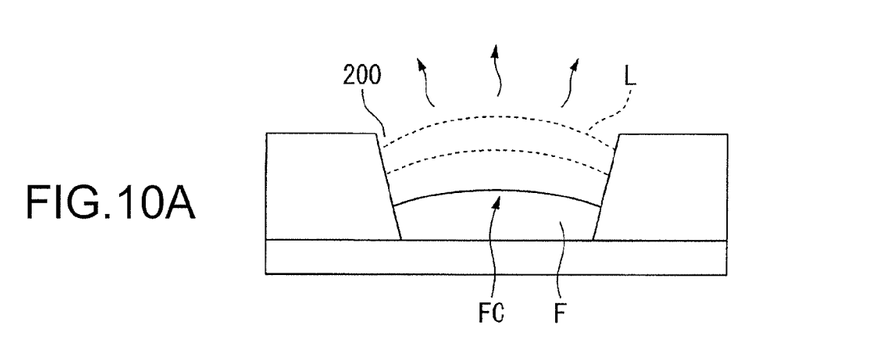
FIGS. 10A and 10B are schematic drawings showing states of thin films formed under environments that are different from each other in evaporation speed of a solvent.
Figure 10B:
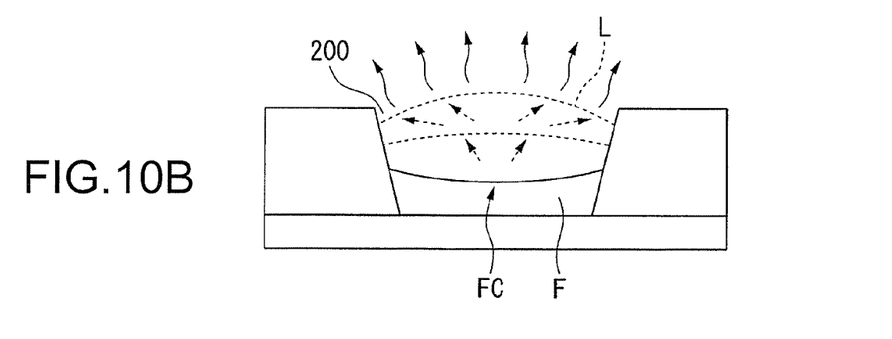

FIGS. 10A and 10B are schematic drawings showing states where thin films are formed by disposing a liquid L including a thin film forming material in a reception part 200 under environments that are different from each other in state of the evaporation of a solvent. Specifically, FIG. 10A shows a state in which a film is formed under an environment where a solvent does not evaporate actively and corresponds to the state of film forming in the above-mentioned central area of the application area. FIG. 10B shows a state in which a film is formed under an environment where a solvent evaporates actively and corresponds to the state of film forming in the above-mentioned peripheral area of the application area.

As shown in FIG. 10A, a flow of the liquid does not occur actively inside the disposed liquid under an environment where a solvent does not evaporate actively. Therefore, the shape of a formed thin film F reflects the shape of the disposed liquid droplet, that is, a central area FC of the thin film F rises in a convex manner.

On the other hand, as shown in FIG. 10B, a flow of the liquid such as one from the inside thereof toward a surface thereof occurs actively inside the disposed liquid under an environment where a solvent evaporates actively. For the same reason, even inside the disposed liquid, the solvent evaporates more actively in the peripheral area of the liquid L than in the central area thereof. Therefore, a flow from the central area toward the peripheral area occurs actively inside the liquid L so that the material for forming the thin film F accumulates more in the peripheral area. As a result, the thin film F is formed in such as manner that the peripheral area thereof is thick and the central area thereof is concave.

As is understood from the above description, there occurs a difference in state between areas of a formed film in accordance with the state of evaporation of the solvent. The difference in state between areas of a film manifests itself in the form of a difference in film thickness (unevenness in film thickness) attributable to a bump and a dip in the central area of the thin film. This results in a display failure (unevenness in display).

SUMMARY

An advantage of the invention is to provide a method for forming high-quality thin films having a uniform thickness by controlling the sizes of reception parts, to which a liquid is to be discharged, in accordance with the ease of evaporation of a solvent included in the liquid.

According to a method for forming a thin film of a first aspect of the invention, the thin film is formed by discharging a liquid including a material for forming the thin film, the material being dissolved or dispersed in a solvent, from a plurality of nozzles so as to dispose the liquid into a plurality of predetermined areas included in an effective area set on a substrate to form the thin film while the plurality of nozzles and the substrate are relatively scanned. The method includes: (a) forming a plurality of reception parts surrounded by a plurality of partitions and bottoms of the predetermined areas, the partitions being provided around the predetermined areas; and (b) forming a plurality of thin films by disposing the liquid from the nozzles into the reception parts. In step (a), a plan view area of at least one of the reception parts in a peripheral area of the effective area is made smaller than a plan view area of the reception part in a central area of the effective area.

By using this method, the area of an externally exposed surface of the disposed liquid in each of the reception areas provided in the peripheral area of the effective area becomes smaller than that in the central area of the effective area. As the area of the externally exposed surface becomes smaller, an area from which the solvent included in the liquid evaporates becomes smaller. The evaporation of the solvent is restricted accordingly. Therefore, the difference in amount of the solvent to be evaporated between the reception parts provided in the peripheral area of the effective area and those provided in the central area thereof is reduced so that evenness in film thickness due to the difference in drying speed is eliminated. As a result, high quality thin films having a uniform thickness are formed.

The method preferably further includes (c) obtaining, prior to step (a), measurement values of thicknesses of thin films formed by discharging the liquid into the predetermined areas under a predetermined discharge condition. In step (a), the reception parts are preferably formed on the basis of the obtained measurement values.

By using this method, the states of thin films to be formed in the predetermined areas are known from the measurement values obtained before forming the reception parts. Therefore, the sizes of reception parts corresponding to predetermined areas in which unevenness in thickness has occurred can be changed reliably. As a result, unevenness in thickness can be eliminated reliably. Note that the "measured values of thicknesses of thin films" according to this embodiment include not only actually measured values but also estimate values obtained from calculations or simulations.

The method preferably further includes (d) measuring, prior to step (a), amounts of the liquid discharged from the nozzles under the predetermined condition.

By using this method, the reception parts are designed and formed in consideration of unevenness in discharge amount among the discharge nozzles. As a result, thin films, unevenness in thickness among which has been more accurately eliminated, are formed.

In the method, in step (d), the liquid is discharged on a measurement substrate whose contact angle with the liquid has been controlled and then the amounts of the discharged liquid are measured by optical interferometry.

By using this method, the measurements are performed with the contact angel controlled using optical interferometry. Therefore, the amounts of the discharged liquid are accurately measured. Since the reception areas are formed on the basis of the obtained measured values, thin films having a uniform thickness are formed In the method, the optical interferometry is preferably white-light interferometry.

If a monochromatic beam is used as the measurement light, the intensity of coherent light is maximized at multiple positions where the optical path difference is an integral multiple of the wavelength of the measurement light. Therefore, a position where the intensity of the coherent light is maximized is not uniquely defined as the thickness of a thin film. On the other hand, white light is formed by collecting monochromatic beams each having multiple wavelengths; therefore, the intensity of coherent light is not maximized cyclically unlike in the case of a monochromatic beam. Only when there is no optical path difference, is the intensity of coherent light maximized. Therefore, the thickness of a thin film is uniquely defined and is therefore measured accurately. As a result, accurate discharge amounts are obtained so that thin films having a uniform thickness are formed.

In the method, in step (d), thin films made of the forming material are preferably formed by evaporating the solvent included in the discharged liquid and then the amounts of the discharged liquid are calculated from volumes of the formed thin films.

By using this method, when measuring the discharge amounts, a measurement error due to a change in volume caused by evaporating the solvent included in the liquid does not occur. As a result, a highly reliable measurement is easily performed.

In the method, the partitions are preferably formed using a photoresist.

A photoresist generally hardens and shrinks to a lesser extent and has high forming accuracy; therefore, the sizes and positions of the partitions can be minutely adjusted. Thus, the reception parts whose sizes have been accurately controlled are formed.

According to a method for manufacturing a color filter of a second aspect of the invention, the color filter is included in an electrooptic apparatus including: a plurality of reception parts surrounded by a substrate and a plurality of partitions disposed around a plurality of pixel areas preset on the substrate; an effective area in which the reception parts are disposed; a plurality of colored layers formed in the pixel areas in the reception parts; and an electrooptic element for emitting light or changing a state of light in accordance with an electric action, the electrooptic element and the pixel areas being overlapped each other in a plan view. The method includes forming at least one of the colored layers in a peripheral area of the effective area with a liquid that includes a material for forming the colored layer, the material being dissolved or dispersed in a solvent, and is disposed in at least one of the reception parts by using the method for forming a thin film of the first aspect of the invention. In the method, at least of the partitions has a sidewall facing the colored layer, and the side wall has a first edge at a bottom making contact with the substrate, and a second edge at a top thereof, and a plan view area surrounded by the first edge is equal to or larger than a plan view area of a pixel electrode included in the electrooptic element and equal to or smaller than a plan view area surrounded by the second edge.

By using this method, the difference in amount of the solvent to be evaporated between the reception parts provided in the peripheral area of the effective area and those provided in the central area thereof is reduced so that unevenness in film thickness due to the difference in drying speed is eliminated. As a result, a color filter including high quality colored layers having a uniform thickness is manufactured.

BRIEF DESCRIPTION OF THE DRAWINGS

The invention will be described with reference to the accompanying drawings, wherein like reference numerals designate like elements.

DESCRIPTION OF EXEMPLARY EMBODIMENTS

Now, a thin film forming method according to an embodiment of the invention will be described with reference to FIGS. 1 to 8. In the following description, a case will be used where the thin film forming method according to this embodiment is applied to a color filter manufacturing method. In order to make the components recognizable, the thicknesses of the components, the ratios between the sizes thereof, and the like vary as appropriate in these drawings.

Figure 1:
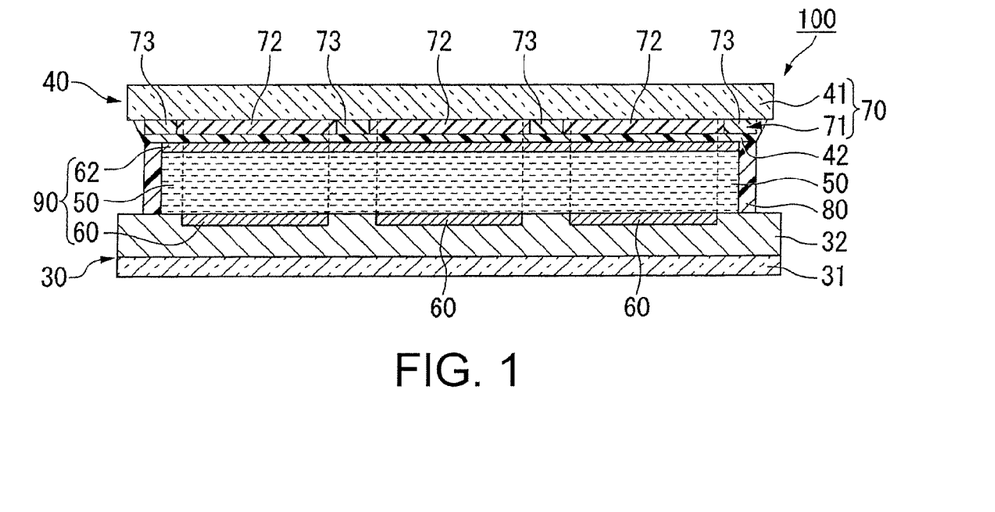
FIG. 1 is a schematic sectional view showing a configuration of a liquid crystal display including a color filter.

FIG. 1 is a schematic sectional view showing a configuration of a liquid crystal display (electrooptic apparatus) 100 including a color filter 70 manufactured using the thin film forming method according to this embodiment. In the following drawings, characters R, G, and B represent red, green, and blue, respectively.

The liquid crystal display 100 shown in FIG. 1 includes an element substrate 30 including pixel electrodes 60, a drive element, and the like, a counter substrate 40 disposed so as to be opposed to the element substrate 30, a liquid crystal layer 50 interposed between the element substrate 30 and counter substrate 40, and a sealant 80 disposed between the element substrate 30 and counter substrate 40 so as to surround the liquid crystal layer 50 and intended to bond these substrates together. Disposed on a side opposed to the liquid crystal layer 50, of the counter substrate 40 is a color filter layer 71. Disposed on the color filter layer 71 is a common electrode 62. The pixel electrodes 60, common electrode 62, and liquid crystal layer 50 interposed therebetween constitute a liquid crystal element (electrooptic element) 90. Illumination light is applied to the liquid crystal display 100 via the element substrate 30.

The element substrate 30 includes a light-transmissive substrate body 31. Among examples of a material for forming the substrate body 31 are inorganic substances such as glass, quartz glass, and silicon nitride and organic polymers (resins) such as an acrylic resin and a polycarbonate resin.

Formed on the inner side of the element substrate 30 (on the side thereof opposed to the liquid crystal layer 50) is an element layer 32. The element layer 32 includes a drive element for driving the liquid crystal display 100, various wiring lines, multilayered inorganic or organic insulating films, and the like. The drive element and the wiring lines are formed by performing patterning by photolithography and then performing etching. The insulating films are formed as appropriate using a generally known method such as deposition or sputtering.

Formed on the inner side of the element substrate 30 are the pixel electrodes 60 made of a transparent, conductive material such as indium tin oxide (ITO). The pixel electrodes 60, which are coupled to drive electrodes (not shown), control the drive of liquid crystal.

On the other hand, the counter substrate 40 includes a substrate body 41, a color filter layer 71 provided on the side opposed to the liquid crystal layer 50, of the substrate body 41, a protection layer 42 provided so as to cover the color filter layer 71, and the common electrode 62 formed on the protection layer 42. The substrate body 41 and color filter layer 71 constitute the color filter 70 manufactured using the thin film forming method according to this embodiment.

A material for forming the substrate body 41 may be a material identical to the material of the substrate body 31. For example, inorganic substances such as glass, quartz glass, and silicon nitride and organic polymers (resins) such as an acrylic resin and a polycarbonate resin may be used as the material of the substrate body 41.

Provided on the substrate body 41 is the color filter layer 71. The color filter layer 71 includes pixels 72 each including a colored layer, and partitions 73 provided around the pixels 72. Each pixel area 72 overlaps a corresponding pixel electrode 60 in a plan view. The plan-view size (plan-view area) of each pixel area 72 is larger than that of a corresponding pixel electrode 60. That is, as shown by dotted lines in FIG. 1, each pixel area 72 is larger in size than a corresponding pixel electrode 60.

Figure 2A:
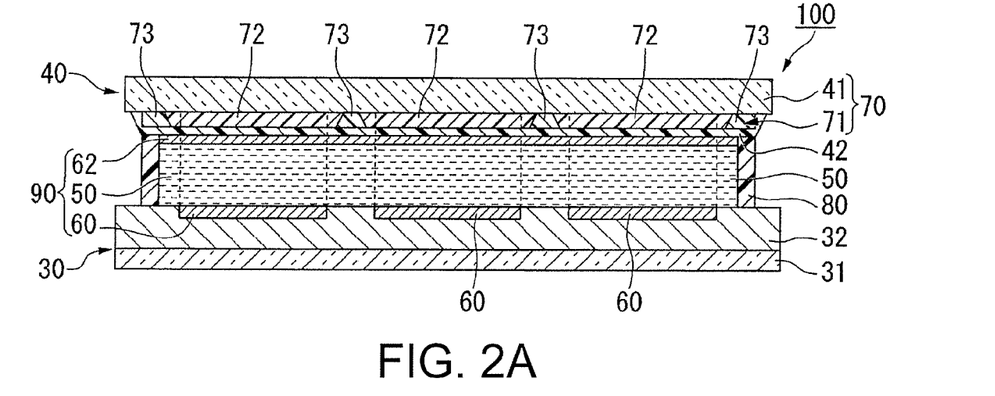
FIGS. 2A and 2B are each a schematic sectional view showing a modified example of the liquid crystal display including a color filter.
Figure 2B:
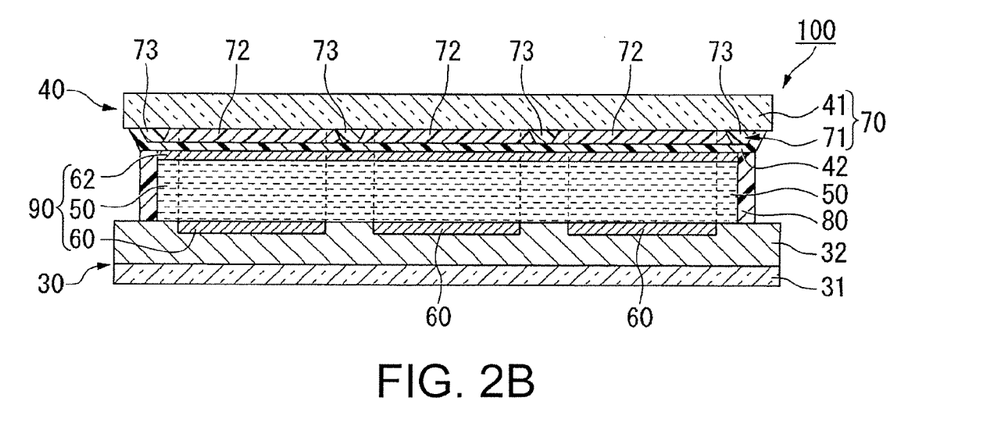

In FIG. 1, each partition 73 is rectangular in section. The area surrounded by a first edge in the depth direction, of a sidewall in contact with a corresponding reception part 79, of each partition 73 and the area surrounded by a second edge in the depth direction, of the sidewall are equal to each other. However, as shown in FIGS. 2A and 2B, if a section of each partition 73 is tapered, for example, forward tapered or inversely tapered, the above-mentioned areas are different from each other. In this case, a smaller one of these areas is equal to or larger than the plan-view area of a corresponding pixel electrode 60. By adopting such a configuration, light that has passed through the liquid crystal layer 50 overlapping the pixel electrode 60 all passes through a corresponding pixel 72. The configuration of the color filter 70 will be described later.

The protection layer 42 covers a surface of the color filter layer 71 so as to protect the surface. The protection layer 42 may be made of a transparent resin material such as an epoxy resin or an acrylic resin.

Formed on the protection layer 42 is the common electrode 62. The common electrode 62 is made of a light-transmissive, conductive material such as ITO.

Besides the above-mentioned components, the element substrate 30 and counter substrate 40 each include an alignment layer for aligning liquid crystal molecules included in the liquid crystal layer 50 in a predetermined direction, a polarizing plate for controlling the polarization of incident light or transmitting light, and, if required, an adhesive layer for bonding layers. However, these components are not shown.

Color Filter

Figure 3A:
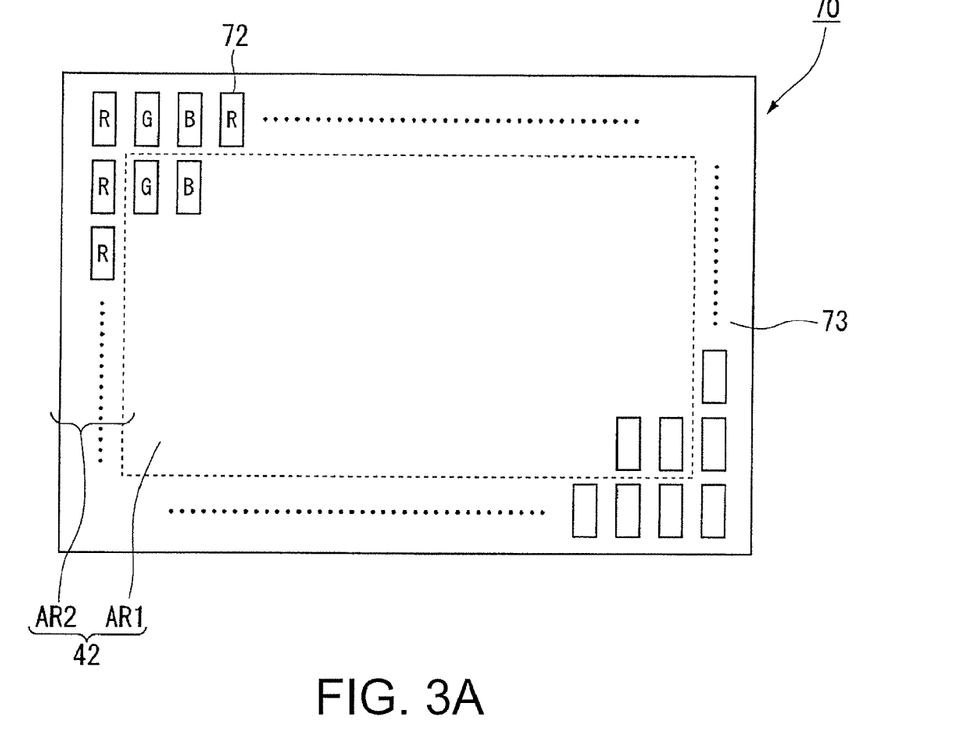
FIGS. 3A and 3B are schematic drawings of a color filter manufactured using a thin film forming method according to an embodiment of the invention.

Next, a color filter will be described. The color filter 70 shown in FIG. 3 is used when the liquid crystal display 100 displays an image in colors. FIG. 3A is a plan view of the color filter 70 and FIG. 3B is a schematic sectional view of a peripheral area thereof.

As shown in FIG. 3A, the color filter 70 includes the substrate body 41 and color filter layer 71 formed on a surface of the substrate body 41. The color filter layer 71 includes the pixels 72 each including a colored layer 75 colored with a color R, G, or B and the partitions 73 formed among the pixels 72. In other words, the color filter 70 is formed by arranging the rectangular pixels 72 in a matrix. This matrix array is a so-called "stripe" pixel array in which each column in FIG. 3A is made up of pixels 72 of an identical color and each row therein is made up of pixels 72 arranged in the order of R, G, and B. Note that the color filter 70 may include pixels of colors other than R, G, and B.

An effective area AR of the color filter 70 in which the pixels 72 are disposed is roughly divided into a central area AR1 and a peripheral area AR2. In FIG. 3A, the peripheral area AR2 is shown as an area including multiple pixels 72 disposed on the outmost portion of the color filter 70.

Figure 3B:
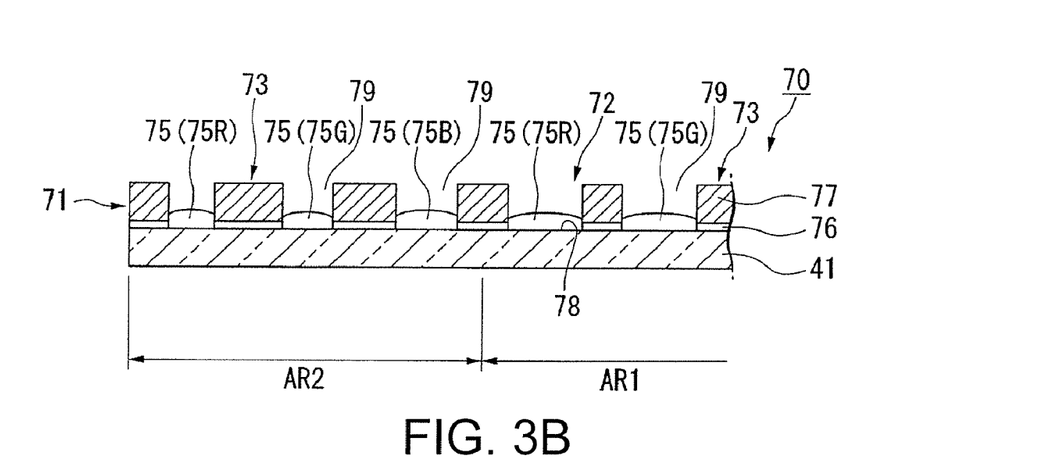

As shown in FIG. 3B, the partitions 73 are provided on the substrate body 41 and defines the pixels 72 that are each rectangular in a plan view. Each partition 73 includes a shading part (black matrix) 76 for blocking light and a partition body 77 provided on the shading part 76. The shading parts 76 are formed by pattering a shading material such as chrome on the substrate body 41. The partition bodies 77 are made of a resin. The pixels 72 are formed in pixel areas (predetermined areas 78) defined by the partition bodies 77. The colored layers 75 (75R, 75G, and 75B) made of color filter materials of colors R, G, and B are disposed on the predetermined areas 78. Thus, the color filter 70 including R, G, and B shown in FIG. 3A is formed.

As will be described later, the colored layers 75 are formed by disposing a liquid in which a material for forming the colored layers 75 is dissolved or dispersed in a solvent, in reception parts 79 that have, as bottoms thereof, the predetermined areas 78 defined by the partition bodies 77. In order to properly dispose the liquid in the reception parts 79, it is preferable to previously perform an $O_2$ plasma process on the exposure surface of the substrate body 41 on which the predetermined areas 78 are to be formed so as to make the exposure surface lyophilic and also perform a plasma process on surfaces of the partition bodies 77 using fluorocarbon such as $CF_4$ so as to make the surfaces liquid-repellent.

The sizes of the reception parts 79 in the central area AR1 are different from those in the peripheral area AR2. In FIG. 3B, three reception parts 79 are disposed in the peripheral area AR2. These reception parts 79 become smaller as they go further from the central area AR1. In FIG. 3B, the size of a reception part 79 varies with the change of the width of a corresponding partition 73.

By transmitting light through selected one or more pixels 72 colored with R, G, or B, the color filter 70 configured as described above displays an image in full color.

Figure 4A:
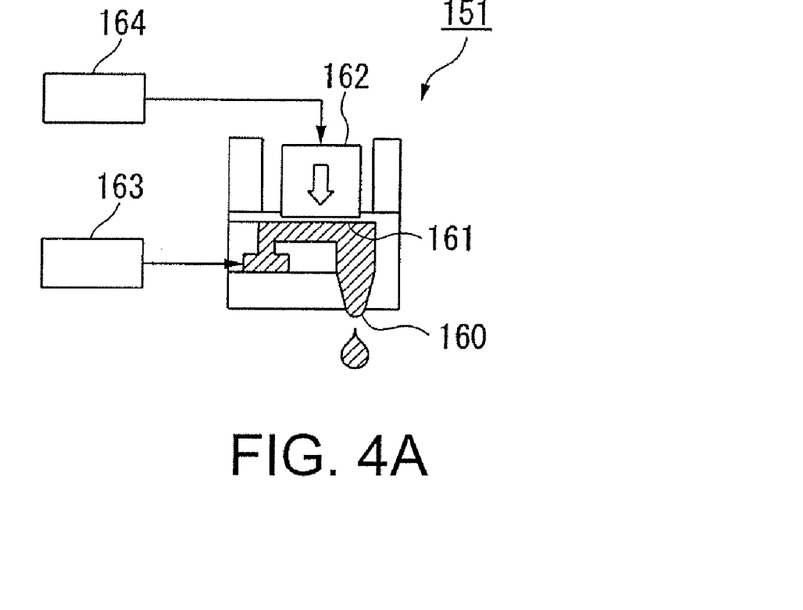
FIGS. 4A and 4B are schematic drawings of a droplet discharge head of a thin film forming apparatus according to this embodiment.
Figure 4B:
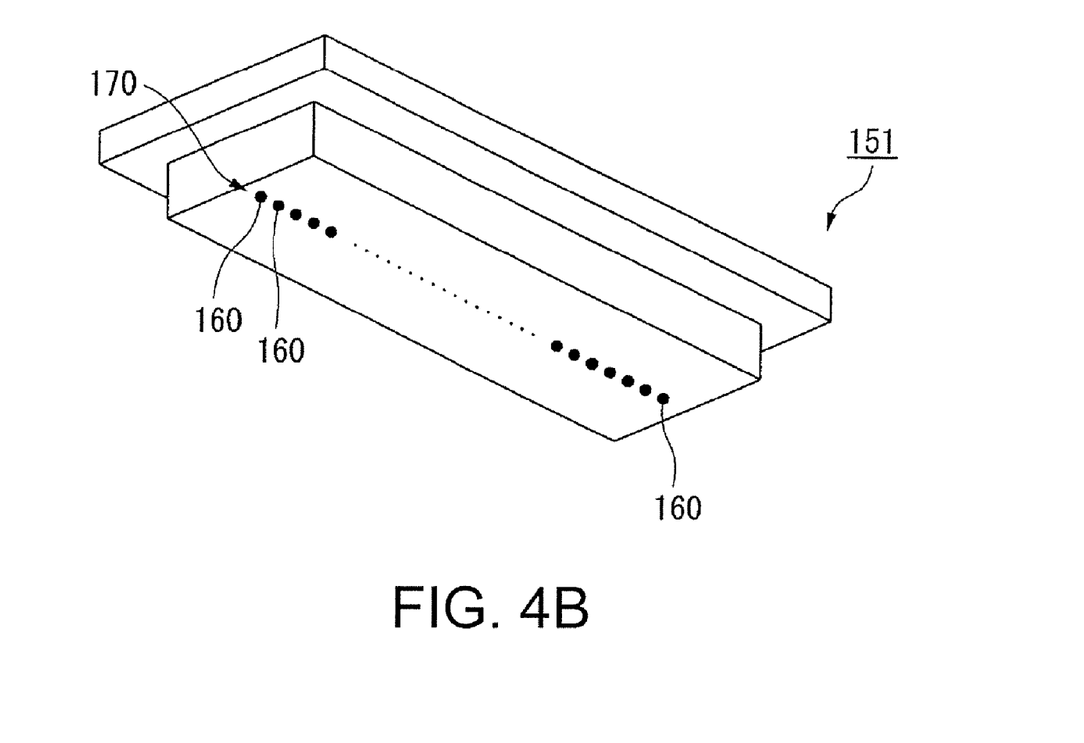

FIGS. 4A and 4B shows schematic views of a droplet discharge head used when performing the thin film forming method according to this embodiment. FIG. 4A is a schematic sectional view of the droplet discharge head and FIG. 4B is a drawing showing a configuration of the droplet discharge surface (bottom surface) of the droplet discharge head.

A droplet discharge head 151 shown in FIG. 4A is a multi-nozzle-type droplet discharge head having multiple discharge nozzles 160. The discharge nozzles are arranged in one direction at given intervals on the bottom of the droplet discharge head 151. Droplets of liquid are discharged from the discharge nozzles 160 of the droplet discharge head 151. The amount of one droplet to be discharged is, for example, 1 to 300 nanograms.

The droplet discharge head 151 according to this embodiment adopts the electromechanical conversion discharge technology. For this reason, a piezoelectric element 162 is provided next to a liquid chamber 161 for storing a liquid. The liquid chamber 161 receives a liquid via a liquid supply system 163 including a material tank for storing a liquid. The piezoelectric element 162 is coupled to a drive circuit 164. By applying a voltage to the piezoelectric element 162 via the drive circuit 164 so as to deform the piezoelectric element 162, the liquid chamber 161 is deformed so that the inner pressure of the liquid chamber 161 is increased. As a result, droplets of the liquid are discharged from the discharge nozzles 160. In this case, by changing the value of a voltage to be applied, the amount of distortion of the piezoelectric element 162 is controlled so that the amount of the liquid to be discharged is controlled.

As shown in FIG. 4B, the droplet discharge head 151 has a nozzle line 170 including, for example, 180 discharge nozzles 160 on the bottom surface thereof. In this case, the discharge nozzles 160 are arranged in parallel with the longitudinal direction on the bottom of the droplet discharge head 151 that is approximately rectangular in a plan view. While the discharge nozzles 160 are arranged in one line in FIG. 4B, the nozzles may be arranged in two lines or in three or more lines in a staggered manner. Also, the number of the discharge nozzles 160 constituting the nozzle line 170 is not limited to any particular number.

Generally, the droplet discharge head 151 is designed so that identical amounts of droplets are discharged from the multiple discharge nozzles 160 with identical application voltages. However, in most cases, the amounts of droplets discharged from the discharge nozzles 160 are not identical to one another due to a nozzle characteristic attributable to a processing error or the like caused when forming thin films. Therefore, even if an identical voltage is applied to all the nozzles, different amounts of droplet are discharged from the nozzles due to the differences in nozzle characteristic among the nozzles. This causes unevenness in thickness of formed thin films. This problem is attributable to the characteristic of the droplet discharge head 151 per se. Therefore, even if a discharge technology such as the charge control method, pressure vibration method, electrothermal conversion method, or electrostatic absorption method instead of the above-mentioned electromechanical conversion method is used, this problem occurs as well.

In this embodiment, colored layers are formed in consideration of unevenness in discharge amount of the discharge nozzles 160 as described above. For this reason, first, the amounts of the liquid discharged from the discharge nozzles 160 are accurately measured. Hereafter, a method for measuring the amounts of the liquid discharged from the discharge nozzles 160 and then a process of manufacturing the color filter 70 will be described.

Figure 5:
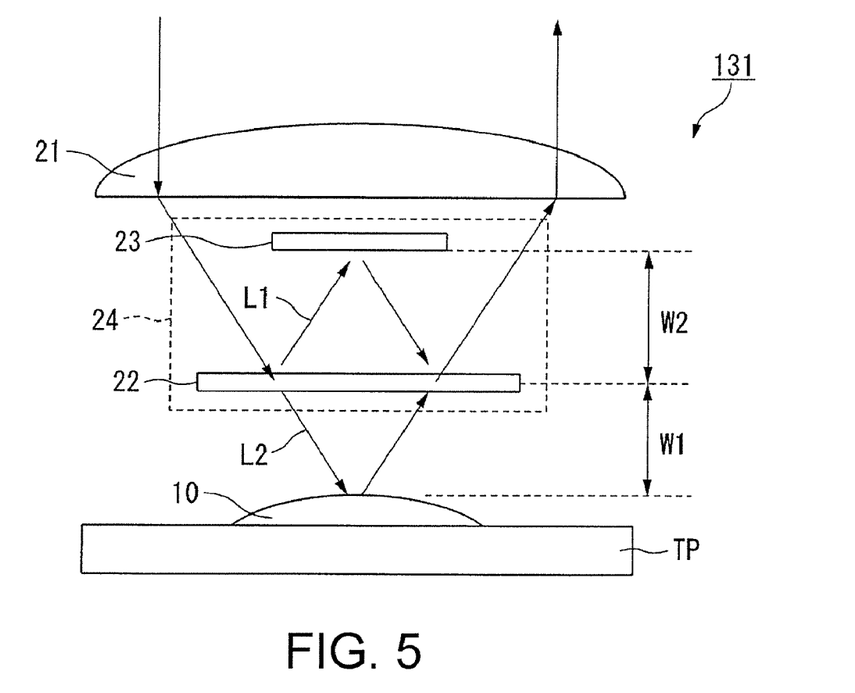
FIG. 5 is a schematic drawing of an optical interferometer included in a discharge amount measuring instrument 131.

FIG. 5 is a schematic drawing showing the principles of vertical scan-type white-light interferometry (white interferometry) applied when measuring discharge amounts in this embodiment. In other words, FIG. 5 is a schematic drawing showing an optical interferometer included in a discharge amount measuring instrument. Among optical interferometries, white interferometry using white light as a light source is preferably used, since white interferometry is allowed to obtain an accurate value due to the nature of white light that has a short coherence length. While the optical interferometer shown in FIG. 5 is of Mirau-type, it is illustrative only. An optical interferometer of Michelson-type or Linnik-type may be used.

As shown in FIG. 5, white interferometry is performed using the optical interferometer including an object lens 21 for focusing parallel light from a white light source, a beam splitter 22 for splitting the light focused by the object lens 21, and a reflection mirror 23 for reflecting the light from the beam splitter 22. The beam splitter 22 and reflection mirror 23 constitute an optical interference lens 24. The optical interference lens 24 has a position adjustment mechanism for changing a distance (W1) from a test object 10 on a measurement substrate TP by minutely moving the optical interference lens 24 in the light axis direction.

The contact angle of the measurement substrate TP with the liquid is less than 90 degrees. Here, for example, a contact angle with the liquid may previously be measured using a dummy substrate whose contact angle with the liquid is identical to that of the measurement substrate TP and then the measurement substrate TP may be selected on the basis of the measurement result. The method for measuring the contact angle may be a known measurement method. For example, the contact angle may be obtained using, as the measurement principle, the θ/2 method in which, assuming that a droplet is a part of a sphere, an angle obtained by doubling an angle between a line linking the outline of a droplet on a liquid disposition surface and the apex of the droplet and the disposition surface is obtained as the contact angle, or the tangent method in which, assuming that the shape of a section of a droplet parallel to a normal to a liquid disposition surface is a part of a circle, an angle between an obtained tangent of the circle and the droplet disposition surface is obtained as the contact angle. Also, a fitting method such as the perfect circle fit method or ellipse fit method may be used.

Measurement substrates TP having different levels of liquid-repellency are prepared by forming liquid-repellent films (not shown) on surfaces of substrates as the base using different types of liquid-repellent materials. For example, if liquid-repellent processes are performed on surfaces of substrates using fluorosilane compounds, different levels of liquid-repellency are easily obtained by forming liquid-repellent films using fluorosilane compounds that are different from one another in the length of a side chain or the number of fluorine atoms included in a molecule. Also, different levels of liquid-repellency are obtained by reducing the amount of a liquid-repellent film to be formed, for example, by reducing the time during which a liquid-repellent process is performed or reducing the amount of a liquid-repellent material to be used. However, if the amount of a liquid-repellent film is small, the level of liquid-repellency may vary in a patchy manner on the liquid-repellent film. Therefore, it is easy and preferable to use different types of liquid-repellent materials.

In the optical interference lens 24 thus configured, incident light emitted by the white light source is applied to the object lens 21 so that the incident light becomes converging light. The converging light is split, by the beam splitter 22 disposed below the object lens 21, into a reference beam L1 that is reflected toward the upper side of the beam splitter 22 that is a side from which the light has entered and a measurement beam L2 that passes through the beam splitter 22 toward the lower side thereof that is a side on which the test object 10 is disposed.

The reference beam L1 is reflected toward the beam splitter 22 by the reflection mirror 23 disposed above the beam splitter 22 and then is reflected by the upper surface of the beam splitter 22. After traveling a reference light path as described above, the reference beam L1 goes toward the object lens 21. On the other hand, the measurement beam L2 is reflected by a surface of the test object 10 and then passes through the beam splitter 22. After traveling a measurement light path as described above, the measurement beam L2 goes toward the object lens 21 as well. That is, after traveling the partially different paths, the reference beam L1 and measurement beam L2 overlap each other on an identical light path and interfere with each other so that coherent light is generated.

In white interferometry, white light having a short coherence length is used; therefore, there is no optical path difference between the reference beam path and measurement beam path. If the lengths of the optical paths become equal to each other, the luminance of the coherent light is maximized. Here, the optical path difference corresponds to a distance difference $\Delta W$ ($=W1-W2$) between the distance ($W1$) between the beam splitter 22 and test object 10 and the distance ($W2$) between the reflection mirror 23 and beam splitter 22. When the distance difference $\Delta W$ becomes zero, the luminance of the coherent light is maximized. The distance W2 is measured from the position where the distance difference $\Delta W$ is zero and then the shape of the test object 10 is measured.

Figure 6:
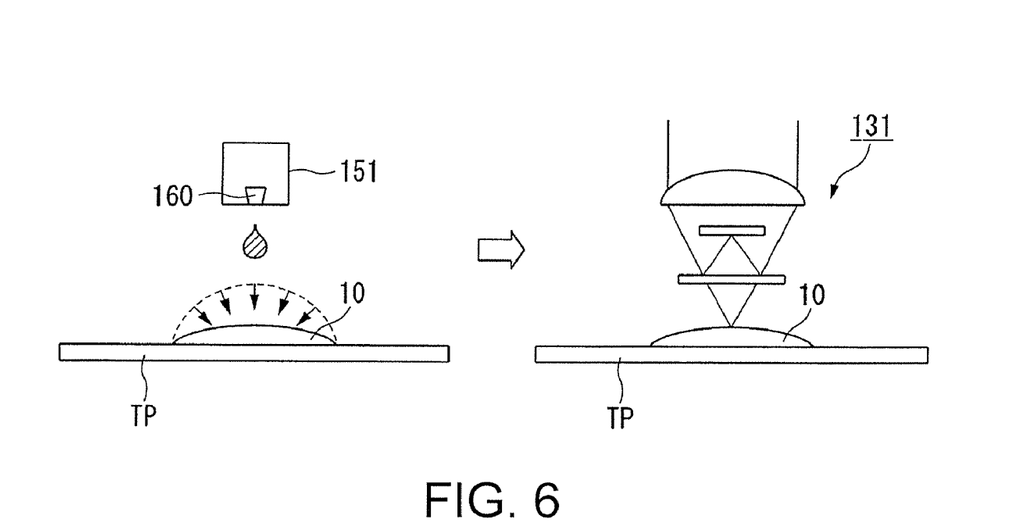
FIG. 6 is a schematic drawing showing a measurement of the amount of a liquid discharged from each discharge nozzle.

The amounts of the liquid discharged from the discharge nozzles are measured using a discharge amount measuring instrument having the above-mentioned measurement principle. FIG. 6 is a schematic drawing showing a measurement of the amount of the liquid discharged from a discharge nozzle. First, the liquid is discharged from one of the discharge nozzles 160 onto the measurement substrate TP. Then, by drying the discharged liquid, the test object 10 made of the material for forming thin films is formed. Then, the shape of the test object 10 is measured using white interferometry as the measurement principle.

In this case, if a substrate whose contact angle with the liquid indicates a value of 50 degrees or more and 70 degrees or less is selected as the measurement substrate TP, the edge shape of the formed test object 10 will be suitable for a measurement using white interferometry. This is because the edge shape of the formed test object 10 will reflect the edge shape of the disposed droplet and that, in vertical scan-type white interferometry, the edge shape of a droplet is an important factor with respect to the accuracy of a measurement.

Figure 7A:
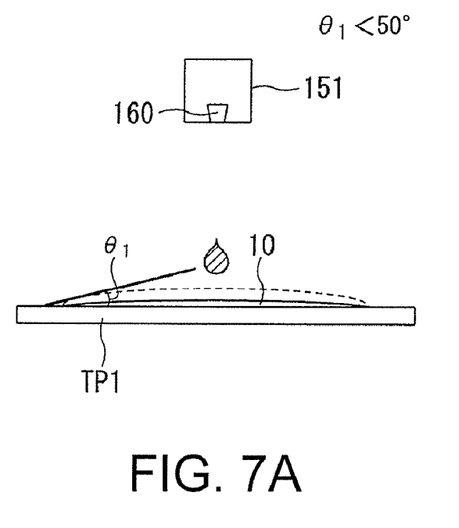
FIGS. 7A to 7D are schematic drawings showing states of unfavorable contact angles.
Figure 7B:
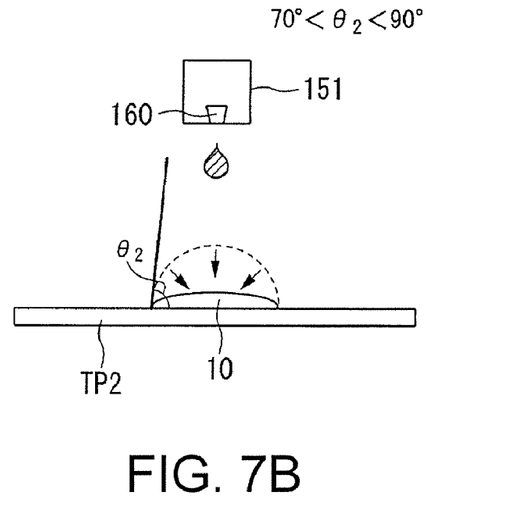
Figure 7C:
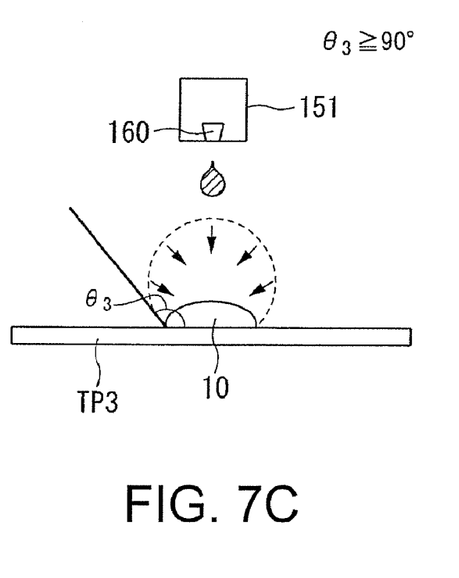
Figure 7D:
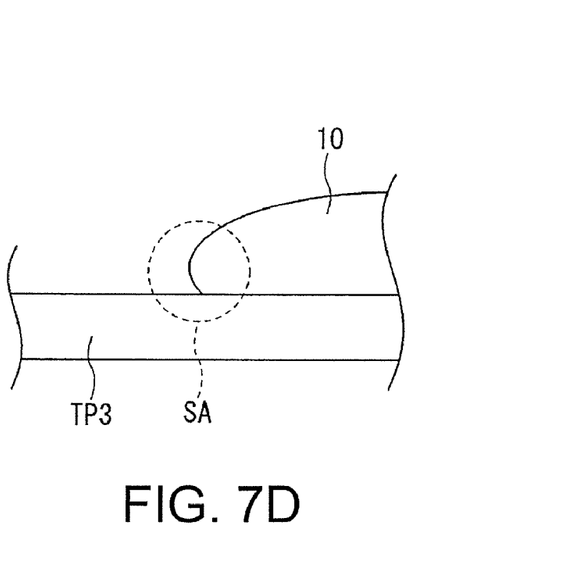

For example, as shown in FIG. 7A, if a measurement substrate TP1 whose contact angle with the liquid is less than 50 degrees is used, the applied liquid spreads thinly while wetting the measurement substrate. In this case, the outline of the formed test object 10 becomes unclear. Also, the differences in thickness among the measurement positions on the surface of the test object 10 are reduced. This makes it difficult to measure the shape of the test object. Also, as shown in FIG. 7B, if a measurement substrate TP2 whose contact angle with the liquid is more than 70 degrees and 90 degrees or less is used, the shape of a surface of the test object 10 to be measured is apt to be discontinuous, since the edge of the formed test object 10 rises steeply. Thus, a measurement error is apt to occur. Also, as shown in FIG. 7C, if a liquid-repellent measurement substrate TP3 whose contact angle with the liquid is 90 degrees or more is used, a shadow area SA (area circled by a dotted line in FIG. 7D) to which light coming from the vertical direction is not applied may occur at an edge of the test object 10, since the edge of the formed test object 10 rises. Accordingly, a measurement result obtained using white interferometry goes wrong.

As is understood from the above description, if a measurement substrate TP having a surface nature suitable for a measurement is used, the shape of the test object 10 is measured accurately using white interferometry. In this case, the amount of the discharged liquid is accurately calculated on the basis of the volume of the test object 10 obtained from the shape of the object and the measured concentration of the liquid. Thus, the accurate discharge amount is obtained.

Figure 8A:
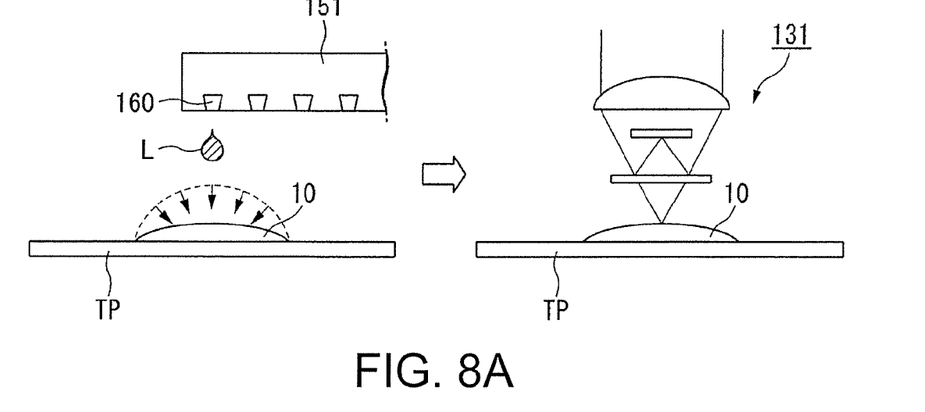
FIGS. 8A to 8C are drawings showing a process of manufacturing a color filter using the thin film forming method according to this embodiment.
Figure 8B:
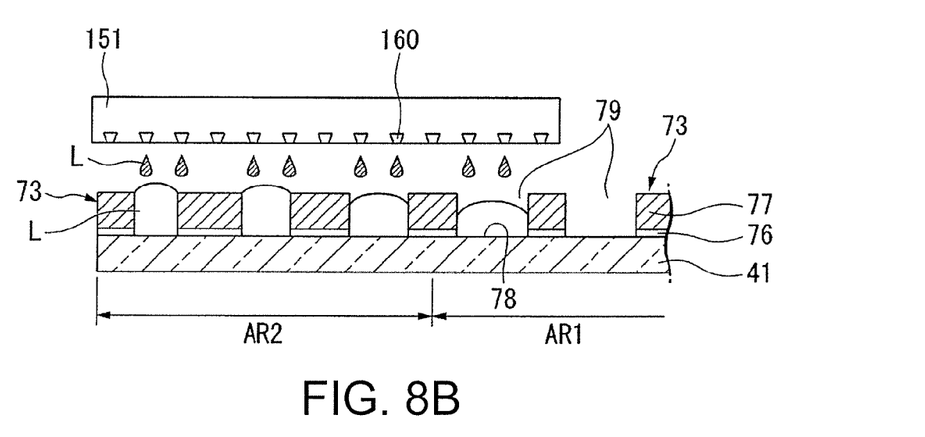
Figure 8C:
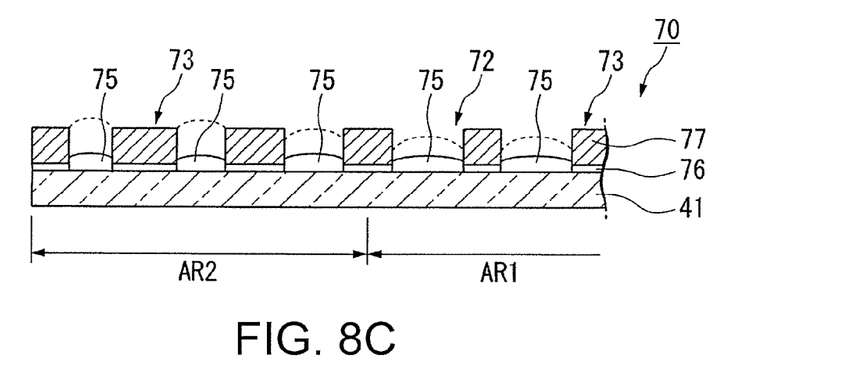

FIGS. 8A to 8C are drawings show a process of manufacturing the color filter 70 using the thin film forming method according to this embodiment. In this embodiment, first, the amounts of the liquid discharged from the discharge nozzles 160 are measured accurately (a step of measuring discharge amounts) using the above-mentioned discharge amount measurement method, then the thicknesses of colored layers under a predetermined film forming condition are measured (a step of obtaining measurement values), then reception parts for receiving the liquid are formed by forming partitions on the basis of the measured amounts (a step of forming reception parts), and then colored layers are formed by discharging the liquid into the reception parts (a step of forming thin films). In this way, the color filter 70 where there is no difference (no unevenness) between the thicknesses of the colored layers 75 in the peripheral area of the effective area and those in the central area thereof is manufactured. Hereafter, the above-mentioned steps will be described in turn while referring to the drawings as necessary.

Step of Measuring Discharge Amounts

First, as shown in FIG. 8A, the liquid L in which a material for forming the colored layers 75 is dissolved or dispersed in a solvent is discharged from the discharge nozzles 160 of the droplet discharge head 151 used when manufacturing the color filter 70. Then, the respective the amounts of the liquid discharged from the discharge nozzles 160 are measured using a discharge amount measuring instrument 131. Due to the measurements, unevenness in discharge amount among the discharge nozzles 160 of the droplet discharge head 151 is made clear. Accordingly, the discharge characteristic of the droplet discharge head 151 is made clear.

Step of Obtaining Measurement Values

Next, the thicknesses of colored layers formed under a predetermined film forming condition are measured. Specifically, the thicknesses of colored layers formed in the central area AR1 and peripheral area AR2 shown in FIG. 3 under the same condition are measured.

In this case, the measurement values may be obtained, for example, by: actually forming colored layers on a dummy substrate in which multiple test areas corresponding to predetermined areas are set on a substrate made of a material identical to that of a substrate body on which colored layers are to be formed and in which test reception parts having a uniform size obtained by surrounding the test areas using partitions are provided; and actually measuring the differences in thickness between the colored layers formed in the central area of the dummy substrate and those formed in the peripheral area thereof. These thicknesses are measured using the above-mentioned optical interferometry as the measurement principle. Also, the thicknesses may be calculated from results obtained by calculating and then simulating the shapes of films formed under a predetermined drying condition for evaporating a solvent.

Step of Forming Reception Parts

Next, as shown in FIG. 8B, the reception parts 79 are formed by providing the partitions 73. The sizes of the reception parts 79 are determined on the basis of the measurement values obtained in the above-mentioned step. Thus, the reception parts 79 are formed so that colored layers to be formed in a later step have a uniform thickness and so that the plan-view area of each reception part 79 in the peripheral area AR2 is smaller than that in the central area AR1. In FIG. 8B, by making the widths of the partitions 73 disposed in the peripheral area AR2 larger than those in the central area AR1, the plan-view area of each reception part 79 in the peripheral area AR2 is made smaller than that in the central area AR1. The three reception parts 79 disposed in the peripheral area AR2 become smaller as they go further from the central area AR1. The partitions 73 for forming the reception parts 79 having such a configuration may be formed by photolithography, e.g., using a photoresist. A photoresist is preferably used as a material for forming the partitions, because partitions are formed shortly and because a photoresist hardens and shrinks to a lesser extent and thus the position accuracy is improved.

Step of Forming Thin Films

Next, as shown in FIG. 8B, the liquid L is discharged from the discharge nozzles 160 under the same discharge condition while causing the droplet discharge head 151 and the substrate body 41 to scan each other. Thus, the discharged liquid L is disposed in the formed reception parts 79. Or, the liquid L may be discharged from multiple discharge nozzles 160. Here, the degree that the surface of the discharged liquid L rises varies depending on the sizes of the reception parts 79. The surface of the discharged liquid L rises highly in the reception parts 79 formed in the peripheral area AR2 than in those formed in the central area AR1.

Next, as shown in FIG. 8C, a solvent included in the liquid is evaporated by subjecting the substrate body 41 onto which the liquid has been discharged, to a predetermined drying process such as heating of the substrate body using a temperature controller such as a ceramic heater or a hot plate. Thus, the colored layers 75 are formed. The degree that the surface of the discharged liquid L rises or the area of an externally exposed surface of the liquid varies depending on the reception parts. Specifically, in the reception parts 79 in the peripheral area AR2 formed so that the plan-view areas thereof are made smaller, the evaporation of the solvent becomes slow compared with a case where the plan-view areas are not made smaller. As a result, the difference in evaporation speed of the solvent between the central area AR1 and peripheral area AR2 is eliminated. Thus, the formed colored layers 75 all rise at the center thereof in a convex manner to the same degree. As a result, the colored layers 75 having a uniform thickness are obtained. What has been described above is the method for manufacturing the color filter 70 using the thin film forming method according to this embodiment.

By performing the above-mentioned method for manufacturing a color filter using the thin film forming method according to this embodiment, the difference in amount of evaporation of the solvent between the reception parts 79 provided in the central area AR1 and those provided in the peripheral area AR2 is reduced. Thus, unevenness in film thickness due to the difference in drying speed is eliminated. As a result, the high-quality colored layers 75 having a uniform thickness are formed.

In this embodiment, the thicknesses of the colored layers 75 formed under a predetermined film forming condition are measured; therefore, the states of the colored layers 75 formed in the predetermined areas 78 are known from the obtained measurement values. Thus, the sizes of reception parts 79 corresponding to predetermined areas 78 in which unevenness in thickness has occurred can be changed reliably. As a result, unevenness in thickness can be eliminated reliably.

Also, in this embodiment, the amounts of the liquid L discharged from the discharge nozzles 160 under a predetermined discharge condition are measured; therefore, the reception parts 79 are designed and formed in consideration of unevenness in discharge amount among the discharge nozzles 160. As a result, the colored layers 75, unevenness in thickness among which has been accurately eliminated, are formed.

Also, in this embodiment, the liquid L is discharged from the discharge nozzles 160 onto the measurement substrate TP whose contact angle with the liquid L has been controlled and then the amounts of the discharged liquid L are measured using white-light interferometry; therefore, the amounts of the discharged liquid are accurately measured. Also, white light is obtained by collecting monochromatic beams each having multiple wavelengths; therefore, the intensity of coherent light is not maximized cyclically unlike in the case of a monochromatic beam. Only when there is no optical path difference, is the intensity of coherent light maximized. Therefore, the discharge amount is uniquely defined and accurately measured. As a result, the colored layers 75 having a uniform thickness are formed on the basis of precise measurements.

Also, in the step of measuring discharge amounts according to this embodiment, thin films (test object 10) made of the forming material are formed by evaporating the solvent included in the discharged liquid and then the discharge amounts are calculated by measuring the volumes of the formed thin films. Therefore, when measuring the discharge amounts, a measurement error due to a change in volume caused by evaporating the solvent included in the liquid L does not occur. As a result, highly reliable measurements are easily performed.

Also, in this embodiment, the partitions 73 are formed using a photoresist. Since a photoresist generally hardens and shrinks to a lesser extent and thus has high forming accuracy, the sizes and positions of the partitions 73 can be minutely adjusted. As a result, the reception parts 79 whose sizes have been accurately controlled are formed.

In this embodiment, the amounts of the liquid discharged from the discharge nozzles 160 are measured using white interferometry, but not limited thereto. For example, using an electronic balance that is allowed to measure a minute amount, the average discharge amount may be calculated from the discharge weights of, e.g., 50 droplets among droplets discharged under a predetermined discharge condition.

While the thin film forming method according to this embodiment has been applied to the method for manufacturing a color filter, the application of the thin film forming method is not limited thereto. The thin film forming method according to this embodiment is applicable when disposing a liquid including a thin film forming material in predetermined positions surrounded by partitions. Specifically, the thin film forming method according to this embodiment is applicable when disposing a functional organic material such as a light-emitting material or a positive hole injection/transport material in predetermined positions in an organic electroluminescent apparatus.

Electronic Apparatus

Figure 9:
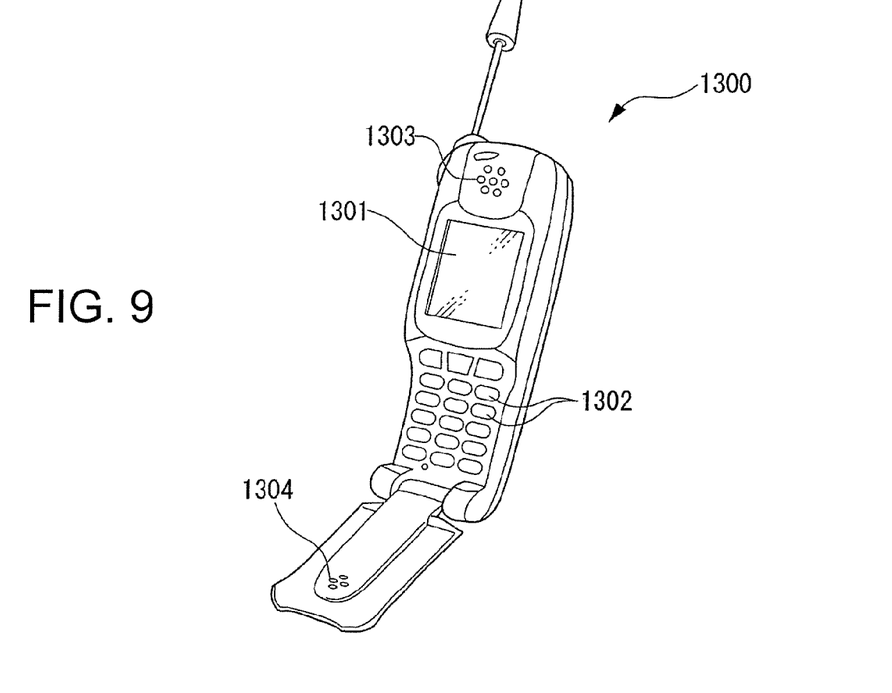
FIG. 9 is a perspective view showing an example of an electronic apparatus including a component formed using the thin film forming method according to this embodiment.

Next, an electronic apparatus manufactured using the thin film forming method according to this embodiment will be described. FIG. 9 is a perspective view showing an example of an electronic apparatus including a color filter formed using the thin film forming method according to this embodiment. A cell phone 1300 shown in FIG. 9 includes a small-size display 1301 that is a liquid crystal display according to this embodiment, multiple operation buttons 1302, an earpiece 1303, and a mouthpiece 1304. By forming a color filter having no density inconsistencies in the cell phone 1300 using the thin film forming method according to this embodiment, the cell phone 1300 including the display having high display quality is provided.

A liquid crystal display according to the above-mentioned embodiment is favorably used as a display for displaying an image in colors using a color filter, of not only the above-mentioned cell phone but also electronic books, projectors, personal computers, digital still cameras, television sets, view finder-type or monitor direct view-type video tape recorders, car navigation systems, pagers, electronic notepads, electronic calculators, word processors, workstations, picture-phones, point-of-sale (POS) terminals, apparatuses including a touch panel, and the like. By adopting such a configuration, an electronic apparatus including a display having high display quality is provided.

While the embodiment of the invention has been described with reference to the accompanying drawings, the invention is not limited thereto. The shapes, combinations, and the like of the components shown in the above-mentioned embodiment are illustrative only and various changes can be made to the shapes, combinations, or the like in accordance with a design requirement or the like without departing from the spirit and scope of the invention.

The entire disclosure of Japanese Patent Application No. 2008-17874, filed Jan. 29, 2008 is expressly incorporated by reference herein.

What is claimed is:

1. A method for manufacturing a color filter to be installed in an electrooptic apparatus having a plurality of pixel electrodes, the color filter including a substrate having a plurality of pixel areas disposed within an effective area at positions corresponding to the pixel electrodes, the method comprising:
   (a) forming a plurality of reception parts surrounded by a plurality of partitions on the substrate, each of the reception parts respectively corresponding to each of the pixel areas disposed within the effective area; and
   (b) forming a plurality of thin films by disposing a liquid including a material for forming a thin film of a colored layer from a plurality of nozzles into the reception parts while the nozzles and the substrate are relatively scanned, wherein
   in step (a), a plan view area of at least one of the reception parts in a peripheral area within the effective area is made smaller than a plan view area of the reception part in a central area within the effective area.

2. The method for manufacturing a color filter according to claim 1, further comprising
   (c) obtaining, prior to step (a), measurement values of thicknesses of the thin films formed by discharging the liquid into the predetermined areas under a predetermined discharge condition, wherein
   in step (a), the reception parts are formed on the basis of the obtained measurement values.

3. The method for manufacturing a color filter according to claim 1, further comprising
   (d) measuring, prior to step (a), amounts of the liquid discharged from the nozzles under a predetermined condition.

4. The method for manufacturing a color filter according to claim 3, wherein
   in step (d), the liquid is discharged onto a measurement substrate whose contact angle with the liquid has been controlled and then the amounts of the discharged liquid are measured by optical interferometry.

5. The method for manufacturing a color filter according to claim 4, wherein
   the optical interferometry is white-light interferometry.

6. The method for manufacturing a color filter according to claim 3, wherein
   in step (d), thin films made of the forming material are formed by evaporating the solvent included in the discharged liquid and then the amounts of the discharged liquid are calculated from volumes of the formed thin films.

7. The method for manufacturing a color filter according to claim 1, wherein
   the partitions are formed using a photoresist.

8. The method for manufacturing a color filter according to claim 1,
   wherein, at least one of the partitions has a sidewall facing the colored layer, the side wall having a first edge at a bottom thereof, the bottom making contact with the substrate, and a second edge at a top thereof, and
   a plan view area surrounded by the first edge and a plan view area surrounded by the second edge are both equal to or larger than a plan view area of a corresponding one of the pixel electrodes included in the electrooptic element.

* * * * *